United States Patent [19]
Smith et al.

[11] Patent Number: 5,513,901
[45] Date of Patent: May 7, 1996

[54] HOIST MECHANISM

[75] Inventors: Fred P. Smith, Alpine; William R. Johnson, American Fork; Fred T. Smith, Alpine, all of Utah

[73] Assignee: Heil Company, Chattanooga, Tenn.

[21] Appl. No.: 212,368

[22] Filed: Mar. 14, 1994

[51] Int. Cl.⁶ .................................................. B60P 1/04
[52] U.S. Cl. ...................... 298/22 J; 298/22 R; 298/220
[58] Field of Search ......................... 298/11, 22 R, 298/22 D, 22 J, 22 P

[56] References Cited

U.S. PATENT DOCUMENTS

| | | |
|---|---|---|
| 1,536,959 | 4/1921 | Martin . |
| 1,612,223 | 1/1922 | Robinson . |
| 1,798,469 | 10/1928 | Heil et al. . |
| 1,973,668 | 9/1934 | Smith . |
| 2,189,052 | 11/1938 | Anthony . |
| 2,190,869 | 2/1940 | Frentzel, Jr. et al. . |
| 2,203,059 | 6/1940 | Palm ............................................ 298/11 |
| 2,232,230 | 5/1940 | Gruber . |
| 2,624,484 | 1/1953 | Dalton . |
| 2,739,837 | 8/1954 | Sykes . |
| 2,761,730 | 9/1956 | Black, Jr. ................................ 298/22 R |
| 3,610,690 | 5/1969 | Mengel . |
| 3,695,709 | 10/1972 | Reinhardt ................................ 298/22 D |
| 3,863,985 | 2/1975 | Zuber ........................................ 298/11 |
| 4,348,054 | 9/1982 | Shonkwiler et al. . |
| 5,064,248 | 11/1991 | Tegtmeier ................................ 298/11 |
| 5,069,507 | 12/1991 | Lindsey . |

FOREIGN PATENT DOCUMENTS

| | | | |
|---|---|---|---|
| 1317383 | 1/1963 | France ........................................ 298/11 |
| 3432619 | 3/1986 | Germany .................................. 298/11 |
| 36144 | 3/1980 | Japan ........................................ 298/11 |
| 231043 | 10/1991 | Japan .................................... 298/22 J |
| 2142308 | 1/1985 | United Kingdom ...................... 298/11 |

Primary Examiner—David A. Bucci
Assistant Examiner—Gregory A. Morse
Attorney, Agent, or Firm—Parsons & Associates; Don J. Flickinger; Robert A. Parsons

[57] ABSTRACT

A hoist mechanism including a hoist subframe, a body subframe, a dump linkage pivotally coupling the body subframe to the hoist subframe such that the body subframe pivots about an instant center which moves continuously as the body subframe pivots and an actuator for moving the body subframe between a lowered position and a raised position. The instant center is positioned at a point below the hoist subframe with the body subframe in the lowered position, and progresses to a point above the hoist subframe as the body subframe is lifted to the raised position.

26 Claims, 16 Drawing Sheets

HOIST MECHANISM

BACKGROUND OF THE INVENTION

1. Field of the Invention

This invention relates to hoist mechanisms.

More particularly, the present invention relates to hydraulic hoist mechanisms for tilting dump bodies.

In a further and more specific aspect, the present invention concerns a hoist mechanism having a moving instant center of body rotation for increased efficiency.

2. The Prior Art

Hydraulic hoist mechanisms for lifting dump bodies are widely used throughout industry and come in a wide variety of types. Typically, hydraulic hoist mechanisms are used on vehicles such as dump trucks or the like, having a dump body pivotally coupled to a vehicle chassis. The dump body is moved between a lowered and a raised position by a hoist mechanism employing one or more hydraulic cylinders. Generally, a rearward end of the dump body is pivotally coupled by a rearward hinge to the vehicle chassis while the forward end is raised and lowered by the hoist mechanism. In this manner, loads of bulk material are emptied from the dump body to the rear of the dump vehicle by gravity with a minimum of effort and manpower.

In the lowered position, a dump body containing a load will be horizontally positioned relative to the vehicle chassis. To dump the load, the hoist mechanism lifts the forward end of the dump body until a desired angle is achieved. Generally a 45–50 degree angle is sufficient for delivery of material from the dump body by gravity. The influence needed to lift the dump body is referred to as torque or moment about the rearward hinge. Load torque is the torque of the weight of the dump body and load about the rearward hinge or pivot point and is greatest when the dump body is initially lifted from the vehicle chassis. Hoist torque is the torque of the hoist force about the rearward hinge or pivot point of the dump body. In order to raise the load, the actual required hoist torque is at least equal to and opposite the load torque. As will be understood by those skilled in the art, the greatest hoist torque is required when the dump body is initially lifted from the vehicle chassis. This is generally referred to as the "breakaway point". As the dump body pivots upward, the hoist torque required reduces. The required hoist torque can be seen as the series of lines in the graph illustrated in FIG. 5 generated by the well known NTEA (National Truck Equipment Association of Detroit, Mich.). The axis of the graph are hoist torque and body angle in degrees. Viewing the graph, it is easily seen that the hoist torque required at the breakaway point is the greatest. With this in mind, the most common types of hoist apparatus may be addressed.

A simple, straight forward type of hoist mechanism is the direct push hoist. The simplest of these is one or more hydraulic cylinders coupled between the vehicle chassis and the dump body. To lift the dump body, the hydraulic cylinder pushes directly against the dump body. For this type of hoist, determining the hoist torque is straight forward. There are two primary factors involved when determining the hoist torque available. These factors are the cylinder force and the length of the lever arm to which the force is applied. The product of this force and distance gives the available hoist torque. Cylinder force can be shown by an arrowed line extending in the direction of piston movement. The length of the lever arm is the length of a line drawn perpendicularly to and extending from the line of cylinder force to the point around which the dump body pivots (rear hinge). Given a desired maximum hoist torque, it will be understood that as the length of the lever arm increases, the cylinder force can be reduced. This translates into reduced cost by being able to use smaller diameter less expensive cylinders. Conversely, if the lever arm shortens, a larger cylinder force and therefore a larger cylinder diameter is required, assuming a constant operating pressure, to provide the same hoist torque. It will be appreciated by one skilled in the art that as the hydraulic cylinder is moved away from the rear hinge towards the front of the vehicle chassis, the lever arm increases.

At first it would appear that a relatively small cylinder could be placed proximate the front of the dump body and substantially upright with respect to the vehicle chassis. This would provide a long lever arm thereby reducing the cylinder force needed. Other considerations, however make this impractical. To begin with, a hydraulic cylinder has a limited stroke length making it impossible to raise the dump body to the desired dump angle, and furthermore the cylinder would take up a great deal of space vertically, prohibiting its use as an underbody hoist.

The problem of stroke length has been answered to some degree by the use of telescoping cylinders. These cylinders extend a great deal further, allowing them to be positioned further forward and still lift the dump body to a sufficient dump angle. The drawback of using these cylinders is their substantially higher cost, and their complexity which reduces reliability and increases maintenance and down time. Furthermore, they still take up a large amount of vertical space prohibiting underbody mounting. Underbody mounting, refers to mounting the hoist mechanism between the floor of the dump body and the frame of the vehicle.

A hydraulic cylinder could be placed closer to the rear hinge where its stroke length would be sufficient to lift the dump body to the desired dump angle. This however would require more cylinder force and therefore a larger more expensive cylinder and structure. Again, the vertical height is large, prohibiting underbody mounting. The vertical height required could be reduced if the hydraulic cylinder is angled toward the rear hinge, however the lever arm is again reduced requiring more cylinder force.

Furthermore, direct lift cylinders are extremely inefficient. The most efficient hoist mechanisms would utilize the maximum force of the hydraulic cylinder throughout the stroke length thereof. As shown previously the greatest hoist torque is required at lift off and reduces as the dump angle increases. Therefore, in a direct lift mechanism, the cylinder force must have a maximum force great enough to satisfy the hoist torque requirement at lift off. After lift off, the hoist torque required drops off, but the available hoist torque provided by the hoist mechanism remains substantially constant. The large cylinder force needed at lift off to provide sufficient hoist torque is no longer needed. This is an inefficient hoist mechanism.

To provide a hoist mechanism which is mounted under a dump body (underbody hoist), and overcome the dilemma of balancing the cylinder force with the length of the lever arm as well as limit mounting height, various types of hoist mechanisms have been developed. The most common and effective types include scissor link hoist mechanisms and lost motion hoist mechanisms. Generally, the basic problem with underbody hoist mechanisms is that they have the least amount of vertical space when the most hoist torque is required and the most vertical space when the least hoist torque is required.

The scissor type hoists include a link pivotally coupled to the dump body, a link pivotally coupled to the vehicle chassis and the other link, and a hydraulic cylinder which actuates the linkage. Basically, the scissor linkage permits the hydraulic cylinder to operate in a more horizontal orientation reducing mounting height and allowing the hoist to be mounted under the dump body. The linkage transmits the cylinder force generally to a point on and at an angle with respect to the dump body such that the lever arm is substantially longer than the positioning and angle of the cylinder in a direct lift hoist would normally allow. In this manner a vertically compact hoist mechanism is achieved.

The drawback to scissor hoists is that they are very inefficient, with the hydraulic cylinder being unnecessarily large throughout most of the lift with the maximum cylinder force only required at lift off.

Lost motion hoist mechanisms are generally similar to scissor mechanisms, but employ some sort of lost motion during the initial lift off, thereby reducing the cylinder force required at lift off while maintaining the needed hoist torque. Lost motion hoist mechanisms employ a variety of different elements, such as slides, rollers or cams to produce the lost motion. These hoist mechanisms employ the lost motion through lift off, then revert to a normal scissor type lift mode. The benefit of these hoist mechanisms is a reduced cylinder force requirement at lift off. The reduced force increases efficiency since a smaller cylinder can be used with the available hoist torque more closely matching the load torque.

While the available torque curves of this type generally follow the load torque curve closely near the lift off, they begin to diverge when the lift shifts to standard scissor type. Again this divergence of the torque curves relates to inefficiency. Furthermore, the lost motion type uses slides, rollers and cams which can cause problems, reducing reliability and increasing maintenance and down time.

It would be highly advantageous, therefore, to remedy the foregoing and other deficiencies inherent in the prior art.

Accordingly, it is an object of the present invention to provide a new and improved hoist mechanism.

Another object of the present invention is to provide an efficient hoist mechanism.

And another object of the present invention is to provide a versatile hoist mechanism having a low mounting height, thereby lowering the height of the dump body and reducing the work needed to load same and also reducing the shipping height of the body and hoist.

Still another object of the present invention is to provide a hoist mechanism which, due to high operative efficiency, utilizes smaller, less costly components and is therefore relatively cost effective.

Yet another object of the present invention is to provide a hoist mechanism which can be mounted on conventional truck chassis.

Yet still another object of the present invention is to provide a hoist mechanism simple to mount on a truck chassis.

A further object of the present invention is to provide a stable hoist mechanism.

And a further object of the present invention is to provide an easily maintainable hoist mechanism.

Yet a further object of the present invention is to provide a hoist mechanism generating a torque which closely matches the load torque throughout the entire dumping cycle.

And another object of the present invention is to provide a versatile hoist mechanism where a range of loads may be carried and dumped by changing the cylinder size, while using the same mass produced linkage and support components.

A further object of the present invention is to provide a hoist mechanism which is light weight, allowing an increase in available payload capacity.

SUMMARY OF THE INVENTION

Briefly, to achieve the desired objects of the present invention in accordance with a preferred embodiment thereof, provided is a hoist mechanism including a hoist subframe, a body subframe, a dump linkage pivotally coupling the body subframe to the hoist subframe such that the body subframe pivots about an instant center of rotation which moves continuously as the body subframe lifts and actuating means for moving the body subframe between a lowered position and a raised position. The instant center is positioned at a point below the hoist subframe with the body subframe in the lowered position, and progresses to a point above the hoist subframe as the body subframe is lifted to the raised position.

The dump linkage includes a front link assembly coupled between the hoist subframe and the body subframe intermediate forward ends and rearward ends thereof and a back link having a first end pivotally coupled to the hoist subframe proximate the rearward end thereof, and a second end pivotally coupled to the body subframe proximate the rearward end thereof.

In a specific embodiment of the present invention, the dump linkage includes two sets of substantially identical links forming parallel front link assemblies. The parallel front link assemblies, hoist subframe, body subframe and back link are constructed and coupled to cooperatively form a pair of 6-bar linkages actuated by the actuating means.

Each front link assembly includes a toggle link having a first end pivotally coupled to the hoist subframe, a front link having a first end pivotally coupled to a second end of the toggle link and a second end pivotally coupled to the body subframe, a motion link having a first end pivotally coupled to the toggle link proximate the first end and a second end pivotally coupled to the body subframe.

In a further embodiment of the present invention, the dump linkage includes two sets of substantially identical links forming parallel front link assemblies. The parallel front link assemblies, hoist subframe, body subframe and back link are constructed and coupled to cooperatively form a pair of 5-bar linkages actuated by the actuating means.

In a yet another embodiment of the present invention, the dump linkage includes two parallel front links. The parallel front links, hoist subframe, body subframe and back link are constructed and coupled to cooperatively form a pair of 4-bar linkages actuated by the actuating means.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings, in which.

DETAILED DESCRIPTION OF THE PREFERRED EMBODIMENT

Figure 1:
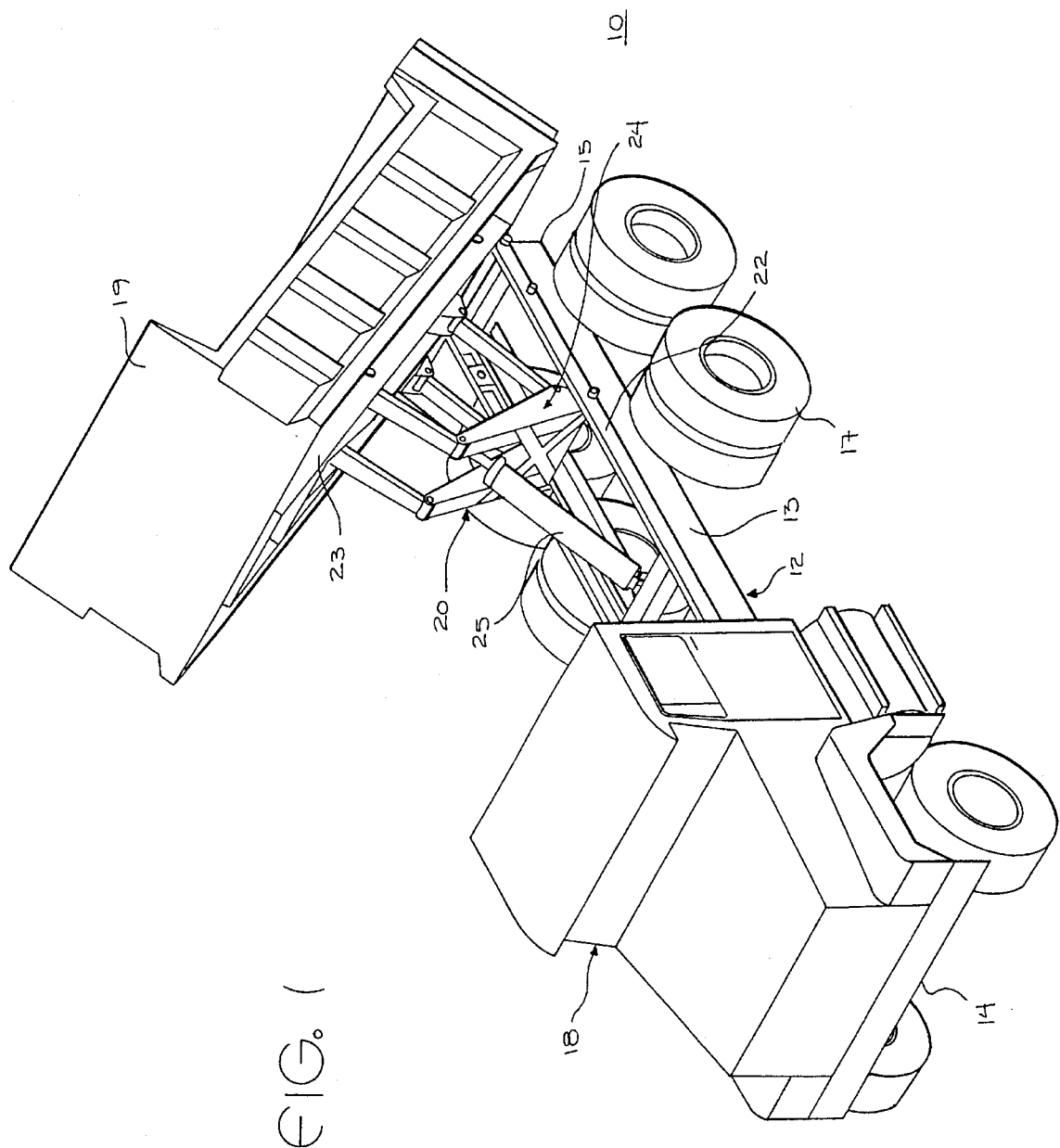
FIG. 1 is a perspective view of a dump hoist mechanism constructed in accordance with the teachings of the present invention as it would appear mounted on a dump vehicle.

Turning now to the drawings in which like reference characters indicate corresponding elements throughout the several views, attention is first directed to FIG. 1 which illustrates a dump vehicle 10. Dump vehicle 10 consists of a vehicle chassis 12 including a frame 13 having a forward end 14 and a rearward end 15 supported and mobilized by a plurality of axles and wheels 17. A cab 18 enclosing an operators compartment, resides proximate forward end 14 and a dump body 19 is mounted upon the rearward part of frame 13 by a dump hoist mechanism 20. For purposes of orientation throughout this description, forward will refer to a direction toward forward end 14 of frame 13 (toward cab 18), and rearward will refer to a direction toward rearward end 15 of frame 13.

Set forth for purposes of orientation and reference in connection with the ensuing detailed description of the preferred embodiment of the instant invention, the foregoing brief description of vehicle chassis 12 is intended to be representative of typical commercially available vehicle chassis. Details not specifically illustrated and described will be readily understood and appreciated by those skilled in the art. Furthermore, dump hoist mechanism 20 is shown mounted on vehicle chassis 12 as an example of a conventional use and is not intended to be limited to that use but can be used in other manners, such as fixedly mounted at a specific site.

Still referring to FIG. 1, dump hoist mechanism 20 moves dump body 19 between a lowered position and a raised position, and includes a hoist subframe 22 coupled to vehicle frame 13, a body subframe 23 coupled to the bottom of dump body 19, a dump linkage 24 which together with hoist subframe 22 and body subframe 23 forms a pair of 6-bar linkages, and an actuator means for operating the 6-bar linkages. In this embodiment the actuator means is a hydraulic cylinder 25, but it will be understood by those skilled in the art that other hydraulic motors, pneumatic cylinders, screw drives and the like may be used.

Figure 2:
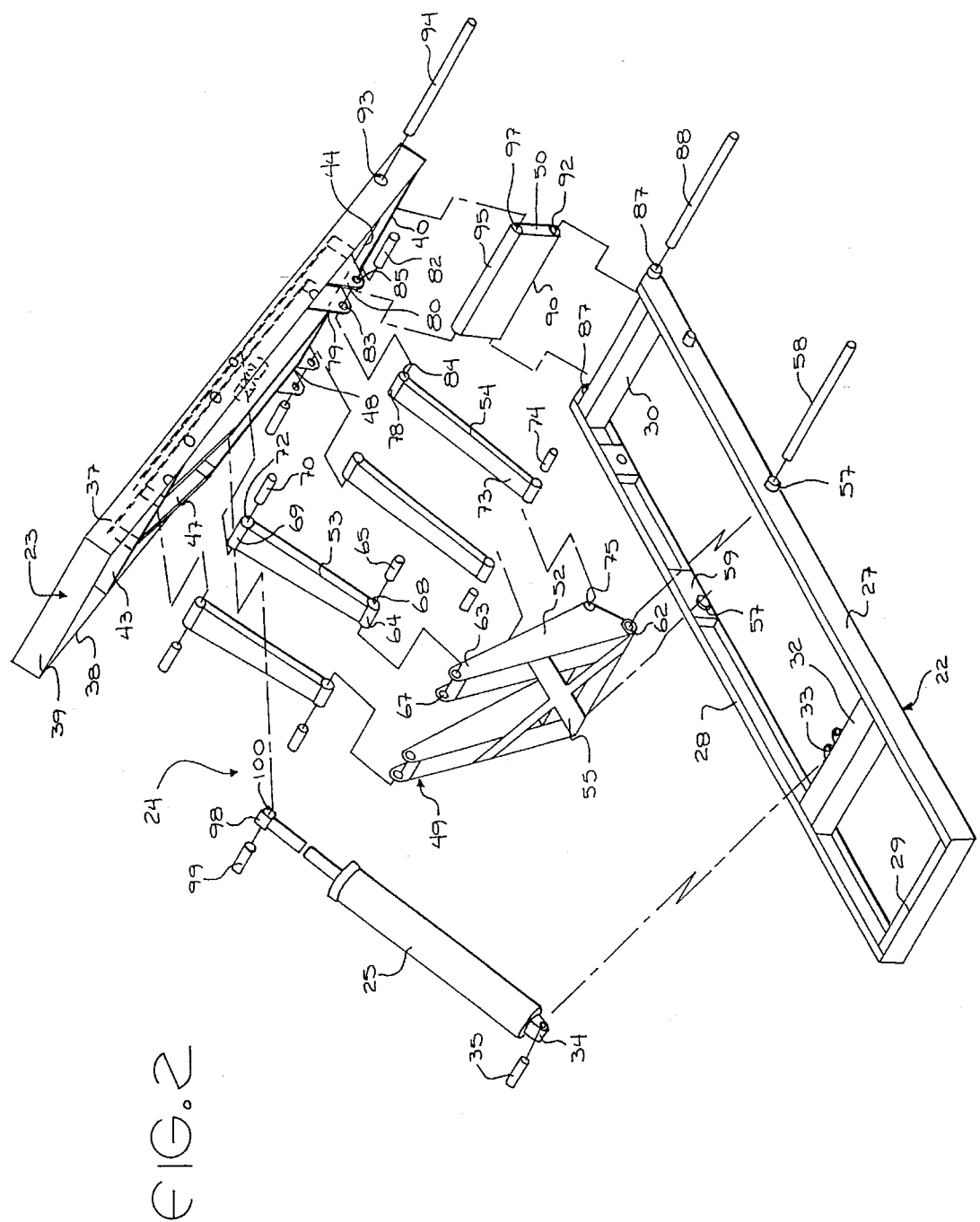
FIG. 2 is an exploded view of the dump hoist mechanism of FIG. 1.
Figure 3:
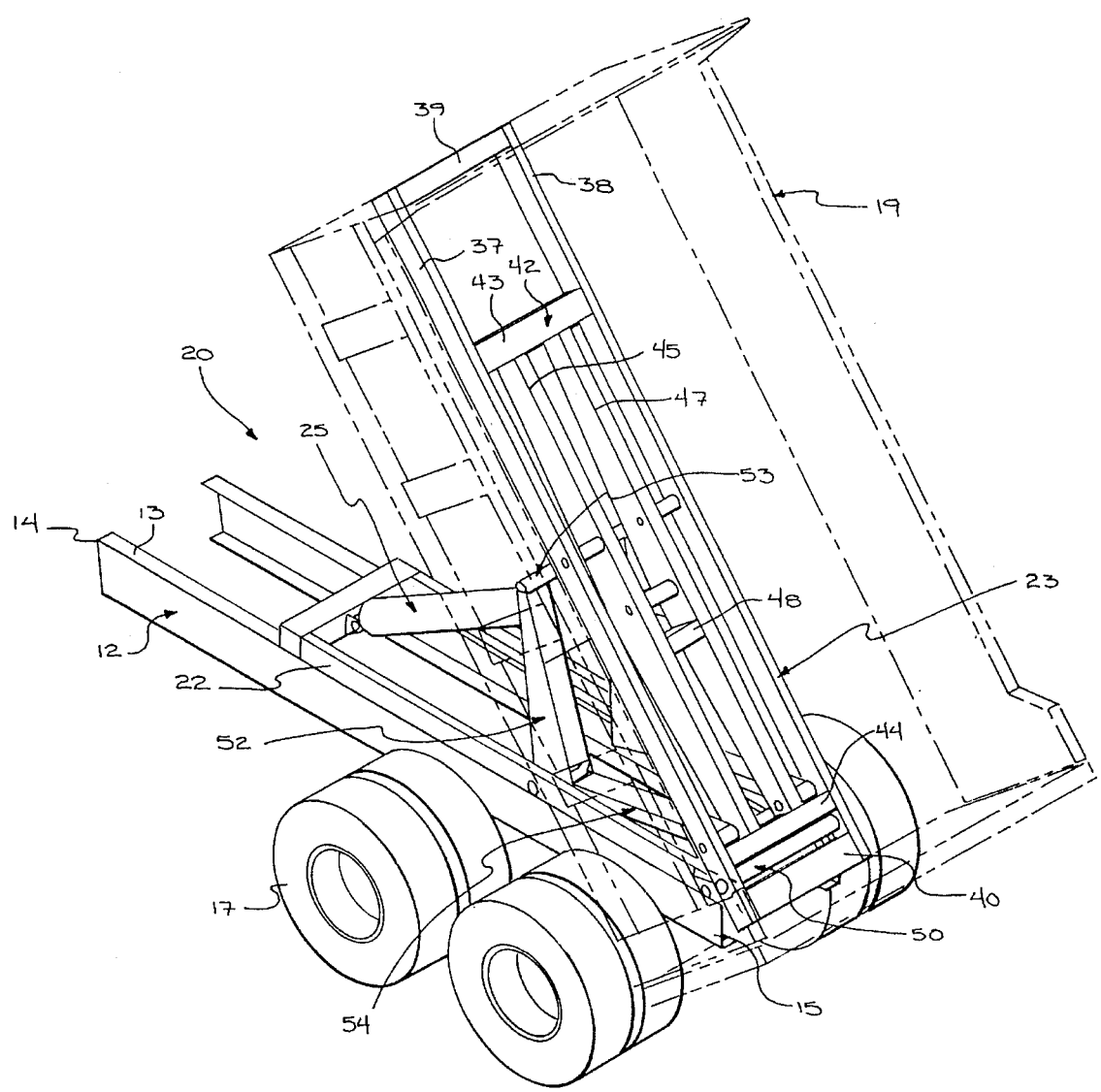
FIG. 3 is a partial perspective view, illustrating the dump hoist of FIGS. 1 and 2.

Referring now to FIGS. 2 and 3, hoist subframe 22 includes a pair of substantially parallel longitudinal members 27 and 28 coupled proximate a forward end by a forward transverse member 29 and coupled proximate a rearward end by a rearward transverse member 30. Longitudinal members 27 and 28 are preferably fabricated of a strong metal such as steel formed into a channel shape for strength and to reduce weight. An intermediate transverse member 32 extends between longitudinal members 27 and 28, intermediate forward and rearward transverse members 29 and 30. Intermediate transverse member 32 is preferably mounted closer to the forward end of hoist subframe 22 and carries a bifurcated bracket 33 on a rearwardly directed side, configured to receive cylinder end 34 of hydraulic cylinder 25. A pin 35 pivotally couples cylinder end 34 to bifurcated bracket 33 allowing upward and downward pivoting of cylinder 25. In short body version of the apparatus, forward transverse member 29 is moved rearwardly, toward intermediate transverse member 32, shortening hoist subframe 22. It will be understood that longitudinal members 27 and 28 will be shortened a corresponding distance. Ultimately, transverse member 29 and intermediate transverse member 32 are one and the same for the shortest version.

Body subframe 23 (best seen in FIG. 3) includes a pair of substantially parallel longitudinal members 37 and 38 coupled proximate a forward end by a forward transverse member 39 and coupled proximate a rearward end by a rearward transverse member 40. A nesting frame 42 is carried intermediate forward transverse member 39 and rearward transverse member 40 and between longitudinal members 37 and 38 to add strength to body subframe 23. Nesting frame 42 includes a forward intermediate transverse member 43 extending between longitudinal members 37 and 38 proximate forward transverse member 39, a rearward intermediate transverse member 44 extending between longitudinal members 37 and 38 proximate rearward transverse member 40, and a pair of parallel longitudinal members 45 and 47 extending between forward intermediate transverse member 43 and rearward intermediate transverse member 44. A transverse member 48 extends between longitudinal members 45 and 47 intermediate forward intermediate transverse member 43 and rearward intermediate transverse member 44 to stiffen longitudinal members 45 and 47 and provide a strengthened area for attaching cylinder 25.

As with hoist subframe 22, body subframe 23 can be constructed in a short bed version. To reduce the length of hoist subframe 23, forward transverse member 39 is moved rearward. It will be understood that longitudinal members 37 and 38 will be shortened a corresponding distance. In the shortest version, forward transverse member 39 will be one and the same with forward intermediate transverse member 43.

Figure 4:
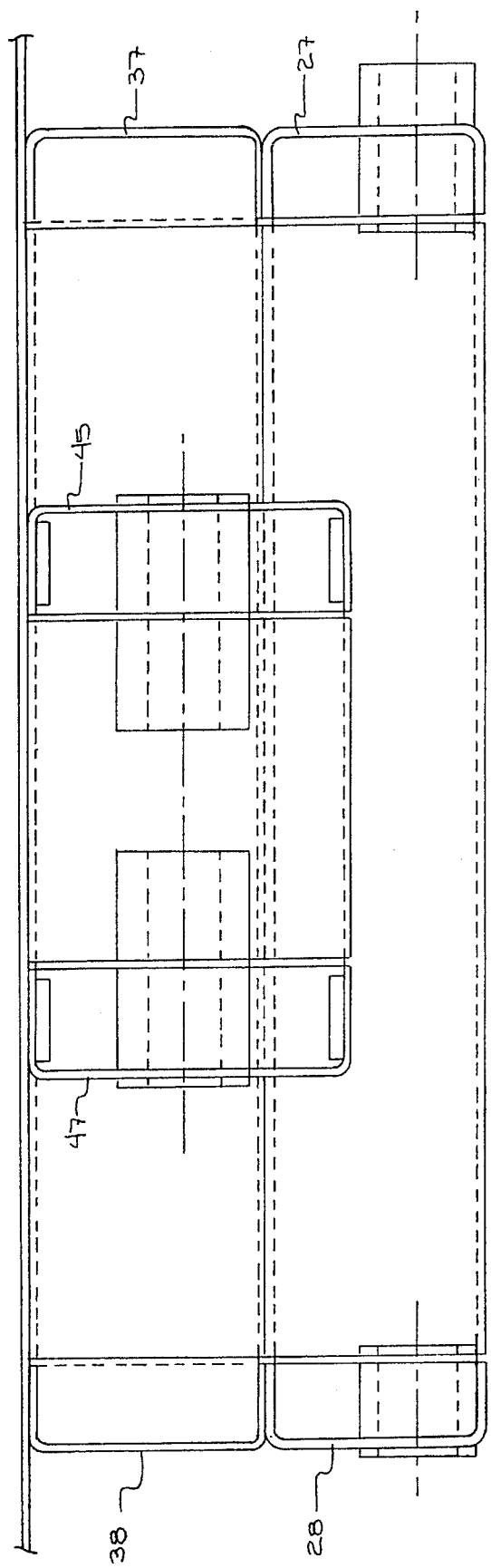
FIG. 4 is a sectional end view of the nesting frame of the body subframe nested within the hoist subframe.

In the lowered position, longitudinal members 37 and 38 of body subframe 23 overlie longitudinal members 27 and 28 of hoist subframe 22. Longitudinal members 45 and 47 of nesting frame 42 thicken intermediate the ends thereof, for added strength. The thickened portions extend downward from body subframe 23 and are accommodated between longitudinal members 27 and 28 of hoist subframe 22 as can be seen with additional reference to FIG. 4. Dump body 19 is coupled to the top of body subframe 23 in a manner well known to those skilled in the art, and therefore will not be described in detail.

The two 6-bar linkages formed by dump linkage 24, hoist subframe 22 and body subframe 23 are actuated by hydraulic cylinder 25 moving body subframe 23 and thereby moving dump body 19 between the lowered position and the raised position. In this embodiment dump linkage 24, hoist subframe 22 and body subframe 23 cooperatively form a first and second 6-bar linkage operating parallel to one another. Each 6-bar linkage includes a front link assembly 49 pivotally coupled between body subframe 23 and hoist subframe 22 intermediate the forward end and the rearward end of dump hoist mechanism 20, and a back link 50 pivotally coupled between body subframe 23 and hoist subframe 22 proximate the rearward end. Each front link assembly 49 includes a toggle link 52, a front link 53 and a motion link 54. The 6-bar linkages are substantially identical, one to each side of dump hoist mechanism 20, therefore only the first will be described in detail. Toggle links 52 are tied together with tension straps 55 extending therebetween to add lateral stability to dump hoist mechanism 20.

A pair of opposing bores 57 extend through longitudinal members 27 and 28 of hoist subframe 22 respectively, for receiving a pivot rod 58. Bores 57 are formed intermediate rearward transverse member 30 and intermediate transverse member 32. A pair of support plates 59 may be coupled to longitudinal members 27 and 28 about bores 57 for added strength. Toggle link 52 includes an end 60 having a bore 62 extending therethrough, journalled about pivot rod 58. Pivot rod 58 extends through bore 62, pivotally coupling toggle link 52 to hoist subframe 22. An opposing end 63 of toggle link 52 is configured to receive an end 64 of front link 53. A pivot pin 65 extends concurrently through a bore 67 formed in end 63 of toggle link 52 and a bore 68 formed in end 64 of front link 53. Front link 53, in turn, has an opposing end 69 pivotally coupled to body subframe 23. End 69 is journalled about a pivot pin 70, with pivot pin 70 extending between longitudinal members 37 and 45, intermediate forward intermediate transverse member 43 and rearward intermediate transverse member 44, and through a bore 72 formed in end 69.

Motion link 54 extends between toggle link 52 and body subframe 23. An end 73 of motion link 54 is pivotally coupled to toggle link 52 proximate end 60. A pivot pin 74 extends concurrently through a bore 75 formed in toggle link 52 and a bore 77 formed in end 73 of motion link 54. An opposing end 78 of motion link 54 is received between plates 79 and 80 extending downward from an outer side of longitudinal member 45 and an inner side of longitudinal member 37 respectively, proximate to and forward of rearward intermediate transverse member 44. A pivot pin 82 extends concurrently through a bore 83 formed in plate 79, a bore 84 formed in end 78, and a bore 85 formed in plate 80, pivotally coupling motion link 54 to body subframe 23.

A pair of opposing bores 87 extend through longitudinal members 27 and 28 of hoist subframe 22 respectively, for receiving a pivot rod 88. Bores 87 are formed rearward of rearward transverse member 30. Back link 50 includes an end 90 having a bore 92 extending therethrough, journalled about pivot rod 88. Pivot rod 88 extends through bore 92 and pivotally couples back link 50 to hoist subframe 22. Another pair of opposing bores 93 extend through longitudinal members 37 and 38 of body subframe 23 respectively, for receiving a pivot rod 94. Bores 93 are formed intermediate rearward transverse member 40 and rearward intermediate transverse member 44. An opposing end 95 of back link 50 has a bore 97 formed therethrough, journalled about pivot rod 94. Pivot rod 94 extends through bore 97 and pivotally couples back link 50 to body subframe 23. While a pair of back links may be employed, one for each 6-bar linkage, in this embodiment a single back link 50 extending across the entire rearward end of dump hoist mechanism 20 is preferred for increased torsional rigidity of hoist mechanism 20.

Piston end 98 of hydraulic cylinder 25 is pivotally coupled to body subframe 23. Piston end 98 is journalled about a pivot pin 99, with pivot pin 99 extending between longitudinal members 45 and 47, proximate to and forward of transverse member 48, and through a bore 100 formed in piston end 98. With dump hoist mechanism 20 in the lowered position, hydraulic cylinder 25 is nested between longitudinal members 45 and 47 and longitudinal members 27 and 28.

Figure 5:
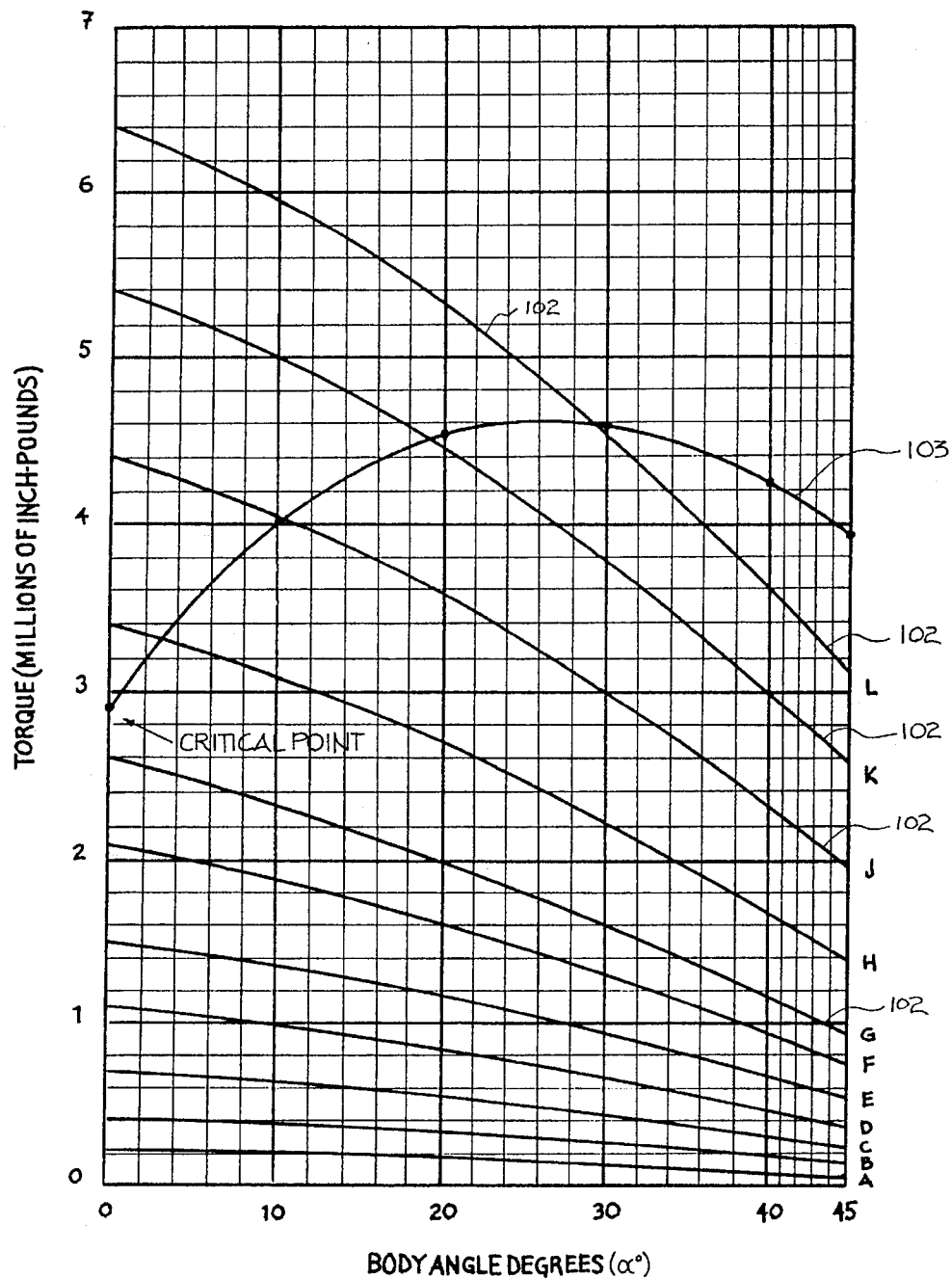
FIG. 5 is a conventional torque curve graph.

Referring now to FIG. 5, a graph of a conventional torque curve is illustrated. Downwardly curved lines 102 represent load torque required at a given body angle. There are eleven curves which distinguish classes A–L. Similar lines can be drawn for classes 70–120 known to those skilled in the art. As discussed in the background, the highest torque requirement is at lift off, with the required torque falling off as the angle of the body increases. Required load torque is calculated by determining the product of the load (weight being lifted including body weight) and the horizontal distance from the center of gravity of the load to the point around which the body pivots, generally the rear hinge. An available torque curve 103 of a prior art hoist is plotted, illustrating that the lowest available torque is at lift off when the highest torque is required. This is the critical point for many hoists, determining in which class the hoist belongs. In this example, the hoist would be classed as G class. As can be seen, there is a great divergence of available torque curve 103 of the hoist and the required torque curve G. The area between the two curves illustrates the inefficiency, with a larger area representing a less efficient hoist than a smaller one.

Set forth for purposes of reference in connection with the ensuing detailed description of the lift motion of dump hoist mechanism 20 of the instant invention, the foregoing brief description of a torque curve graph is intended to be representative of the torque curve of a typical commercially available hoist mechanism. Details not specifically illustrated and described will be readily understood and appreciated by those skilled in the art.

Figure 11:
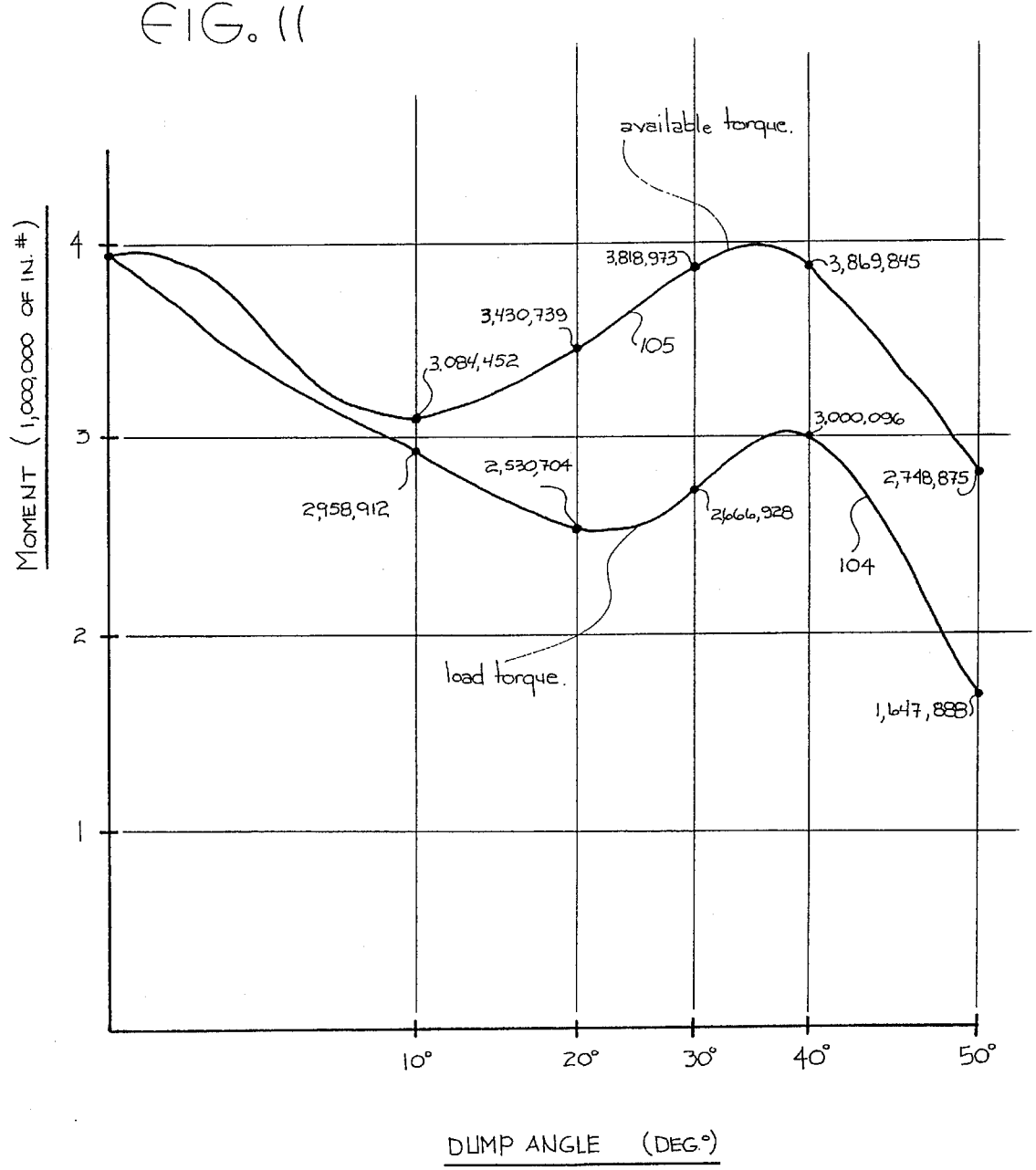
FIG. 11 is a graph of the torque curve of the instant dump hoist mechanism.

The dump motion of dump hoist mechanism 20 is illustrated in FIGS. 6–9 and the graph of FIG. 11. In order to properly describe this motion, a curve 105 of the maximum available torque must be generated and compared to a curve 104 of the load torque required to lift a dump body mounted on a vehicle chassis with a dump hoist mechanism 20. As will become apparent through the description of the dump motion and with reference to FIG. 11, the load torque curve 104 is substantially different than conventional load torque curve 102 illustrated in FIG. 5. Furthermore, the available torque curve 105 closely matches load torque curve 104 illustrating the increased efficiency.

Figure 10:
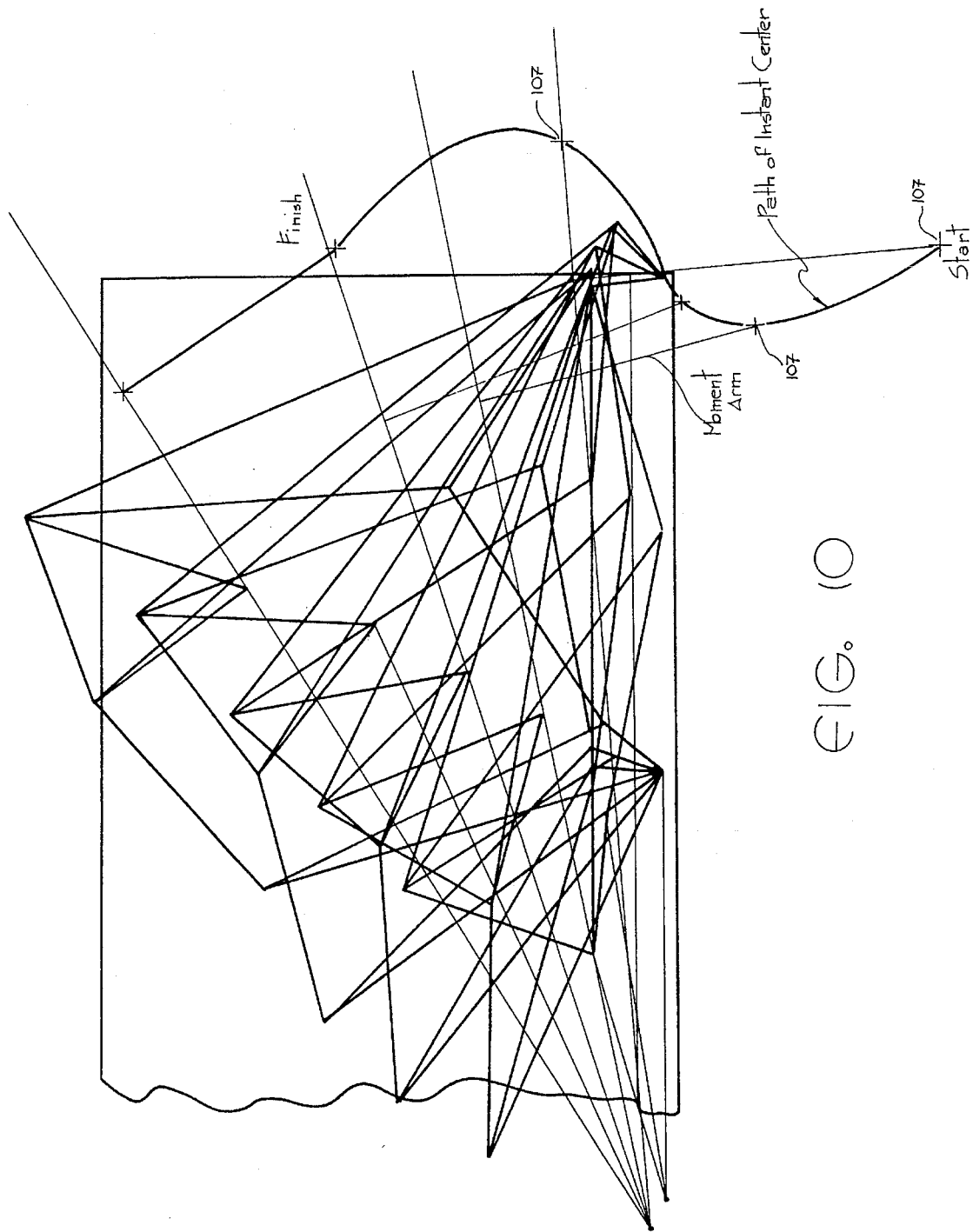
FIG. 10 is a diagram illustrating the movement of the instant center of rotation throughout the entire lift.

Still referring to FIGS. 6–9, in determining the torque involved, whether available or load, an explanation of a novel feature of the present invention must first be addressed. This feature is termed a moving instant center of rotation 107. Instant center 107 is the point about which the dump body pivots with respect to hoist subframe 22. Due to the pivoting nature of back link 50, instant center 107 does not remain in a fixed position, but moves through a predetermined path as illustrated in FIG. 10. The location of instant center 107 at any given body angle in this embodiment, is determined by extending a line 108 through the pivot points of front link 53 and extending a line 109 through the pivot points of motion link 54. A line 110 is then extended from the intersection of lines 108 and 109 and through the point at which the links are coupled to hoist subframe 22, which corresponds to pivot rod 58 extending through end 60 of toggle link 52. The intersection of a line 112 extending through the pivot points of back link 50 with line 110 marks the position of instant center 107. The instant center need not be in the mechanism.

Determining the maximum available torque of dump hoist mechanism 20 requires knowing the length of the lever arm. The length of the lever arm is determined by extending a line 113 in the direction of applied cylinder force. The length of a line 114 extending perpendicularly from line 113 to instant center 107 gives the length of the lever arm for this embodiment. The available torque is the product of the cylinder force time the length of line 114.

Figure 6:
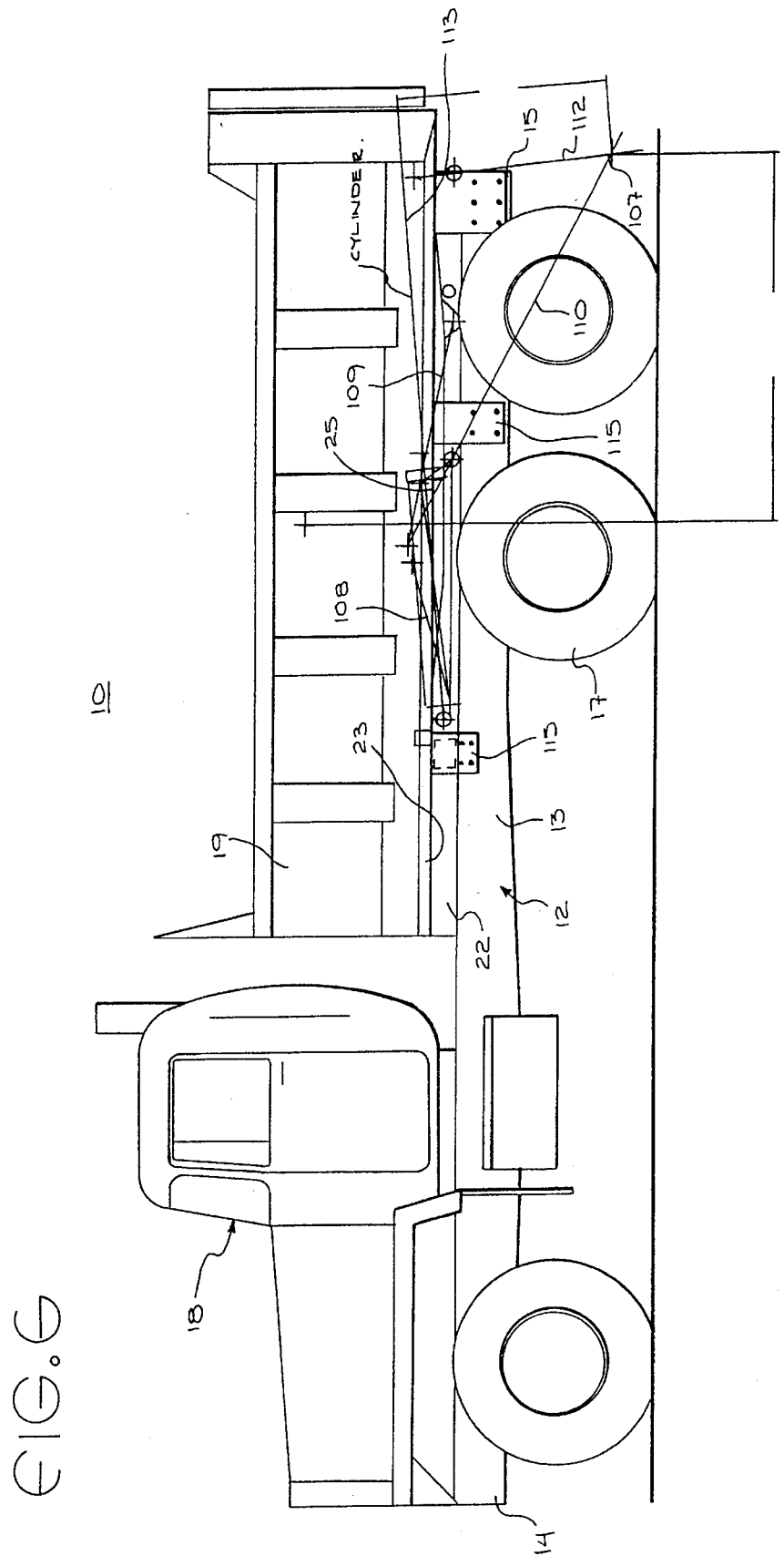
FIG. 6 is a side view of the vehicle of FIGS. 1 and 3 as it would appear with the dump hoist in the lowered position.

Referring specifically to FIG. 6, dump vehicle 10 is illustrated with dump body 19 in the lowered position. Dump hoist mechanism 20 is coupled to vehicle chassis 12 by side mounting plates 115 coupling hoist subframe 22 to frame 13. Dump body 19 is coupled to vehicle chassis 12 by dump hoist mechanism 20, with body subframe 23 coupled to bottom of dump body 19. In the lowered position, instant center 107 is located substantially below and toward the rear of back link 50. Compared with conventional hoist mechanisms employing rear hinges, the lowered position of instant center 107 will provide a much longer lever arm. The longer lever arm allows lower cylinder force, which translates to smaller hydraulic cylinders thereby reducing costs. Furthermore a pivot actually in the location of instant center 107 would be so low as to seriously affect the function of the dump vehicle.

During lift off, as illustrated in FIG. 6, hydraulic cylinder 25 is very close to horizontal. This is possible because instant center 107 is substantially lower than back link 50 resulting in a long lever arm. With body subframe 23 resting upon hoist subframe 22 and front link assembly 49 and cylinder 25 enclosed thereby, an extremely low mounting height of, for example, 12 inches is achievable. This low mounting height permits dump hoist mechanism 20 to be mounted on dump body 19 prior to shipment. Dump body 19 and dump hoist mechanism 20 can then be shipped to the location of the vehicle chassis for installation. Many conventional hoist mechanisms must be shipped separately due to the height, and installed on the body and chassis later. This can present problems and extra expense of the overall system.

Figure 7:
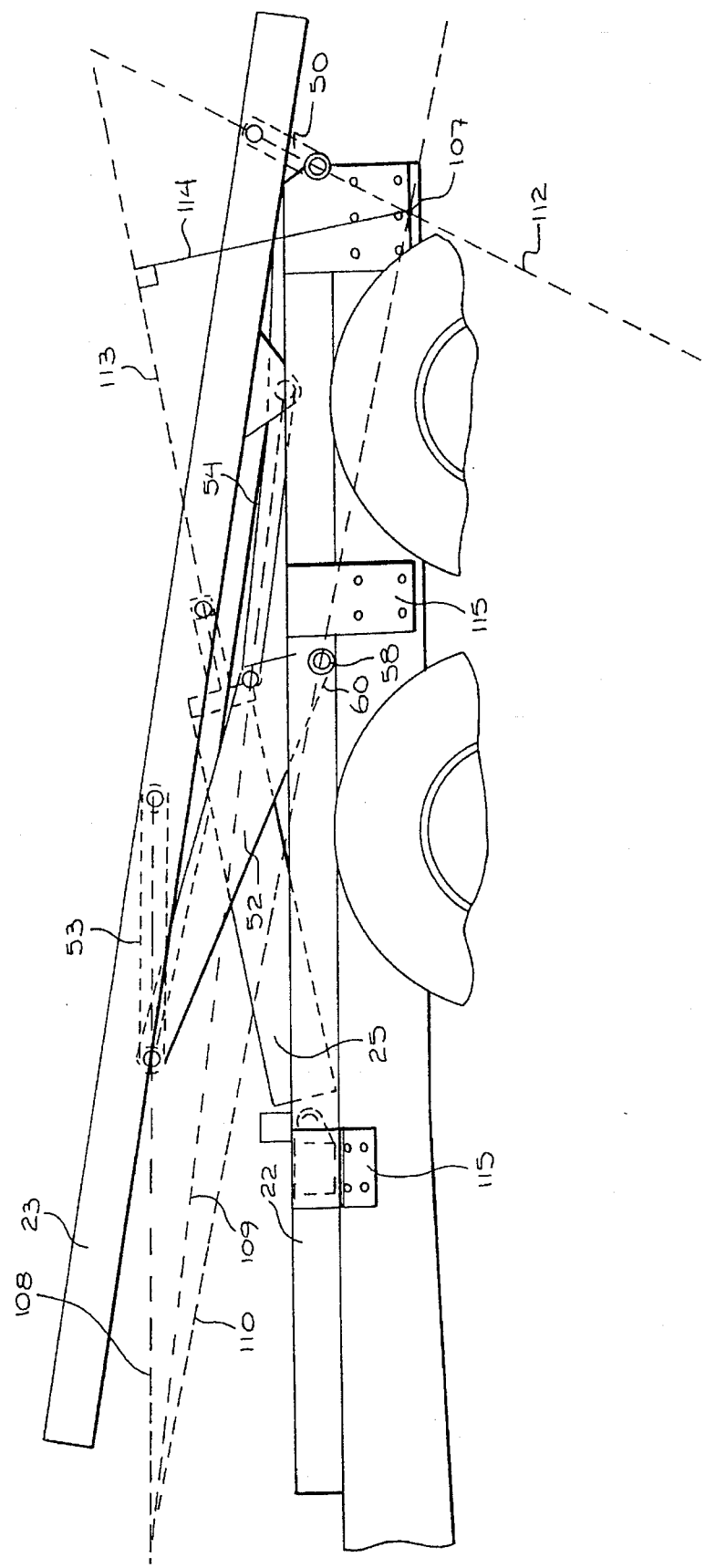
FIG. 7 is a partial side view of the dump vehicle illustrating the dump hoist in a partially raised position just after lift off.
Figure 8:
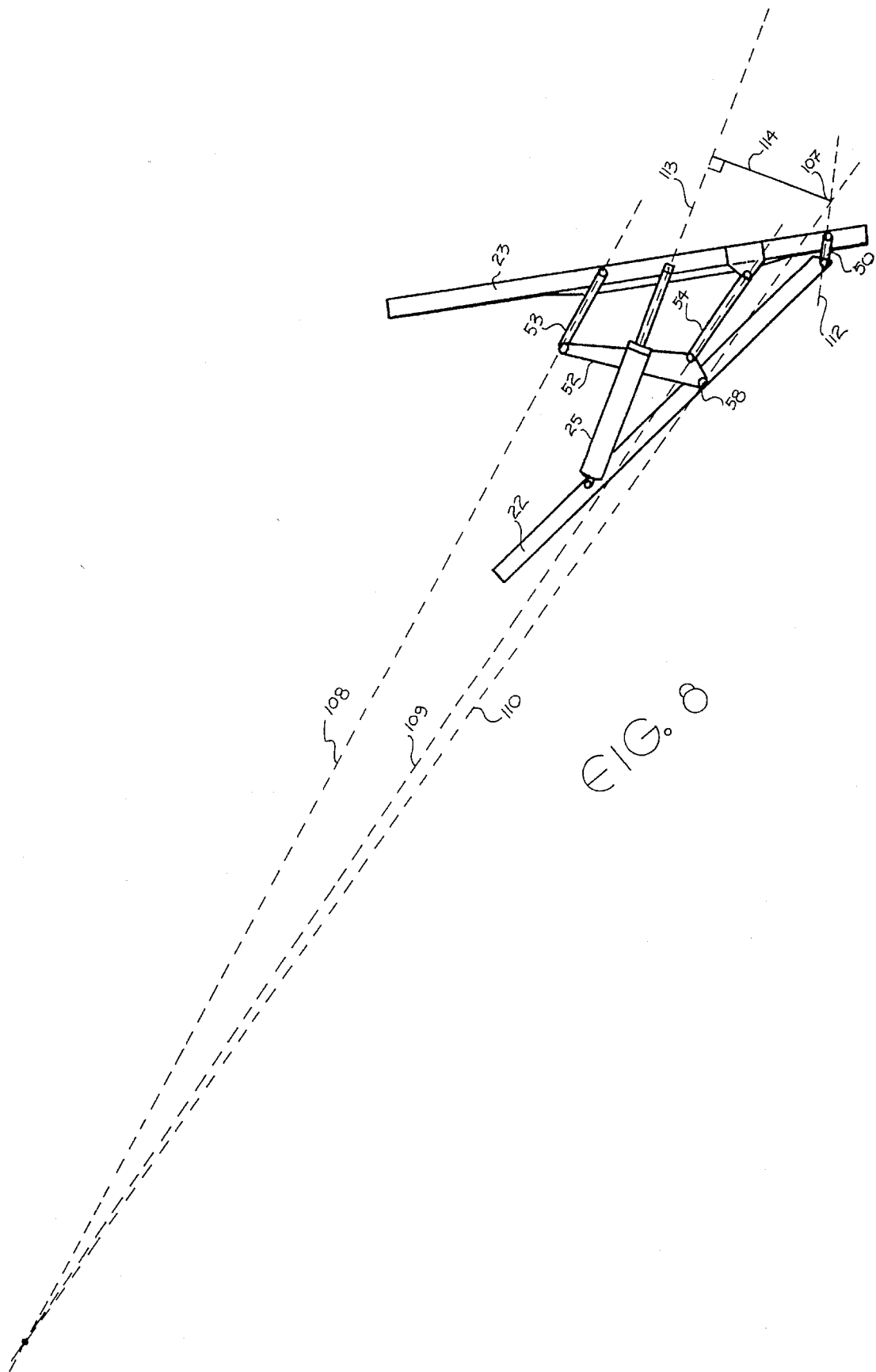
FIG. 8 is a diagrammatic side view illustrating the hoist apparatus of FIGS. 6 and 7 as it continues to rise.
Figure 9:
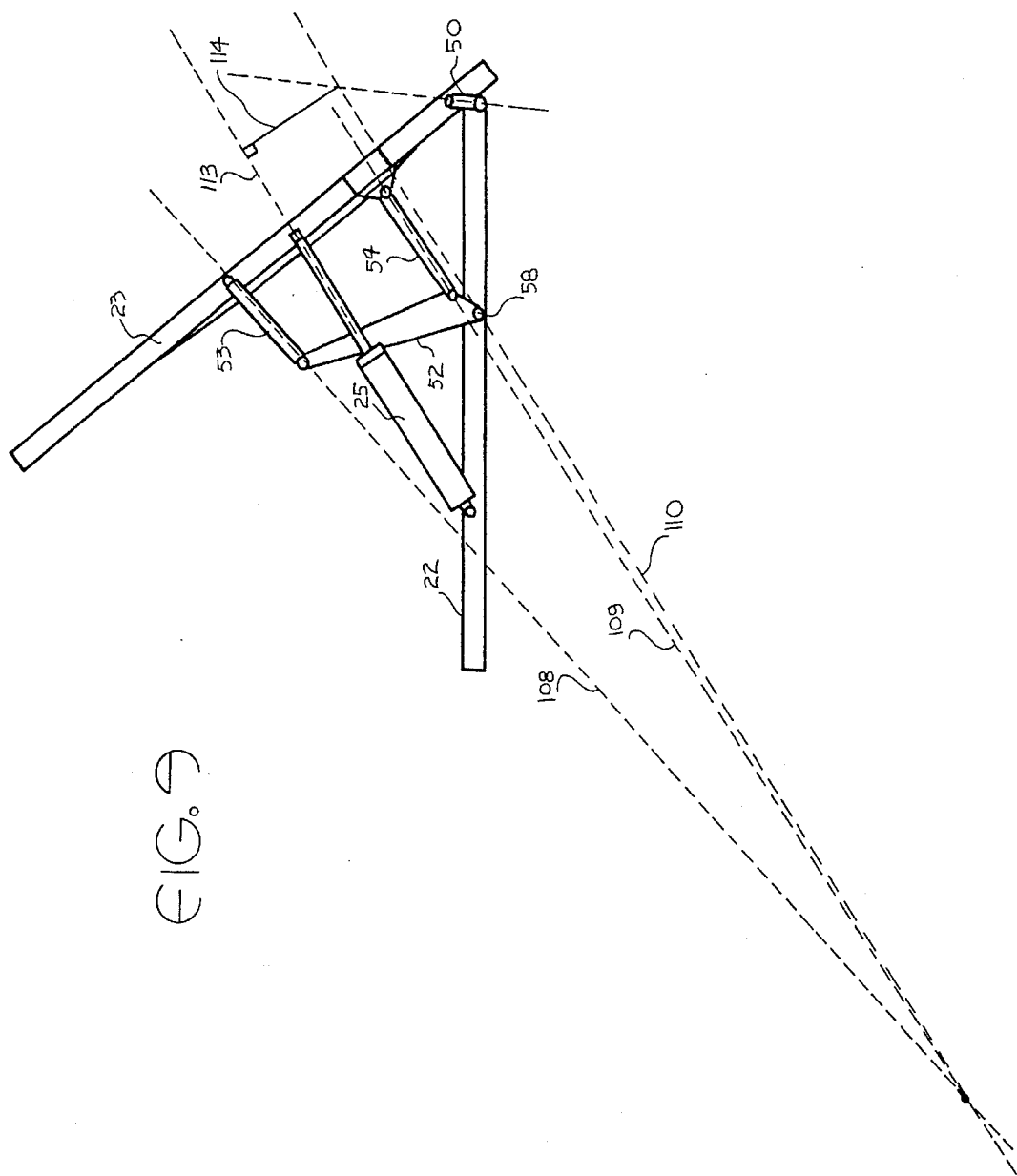
FIG. 9 is a diagrammatic side view illustrating the hoist apparatus of FIGS. 6, 7 and 8 in the fully raised position.

Turning now specifically to FIG. 7, dump hoist mechanism 20 is illustrated after lift off. During lift off body subframe 23 was moved rearward with back link 50 dropping rearward end of body subframe 23 as the forward end was lifted. Instant center 107 has moved in an upward and forward direction, but is still positioned below back link 50. As the lift progresses (FIG. 8), instant center 107 moves above body subframe 23 and front link assembly 49 begins to pull body subframe 23 forward, thereby causing back link 50 to raise the rearward end of dump body 19. This also puts dump body 19 in a position for dumping into conventional accessory vehicles such as pavers, chippers and other road equipment. A pivot which stays low would make this impossible. At the fully raised position (FIG. 9), instant center 107 has moved to a position substantially above body subframe 23. FIG. 10 clearly shows the path of instant center 107 through the entire lift, beginning substantially below dump hoist mechanism 20 to increase the lever arm when required torque is high, and ending above dump hoist mechanism 20 when less torque is required.

Referring to FIG. 11, available torque is plotted at different dump angles, producing available torque curve 105. Available torque curve 105 matches closely with load torque curve 104.

Figure 18:
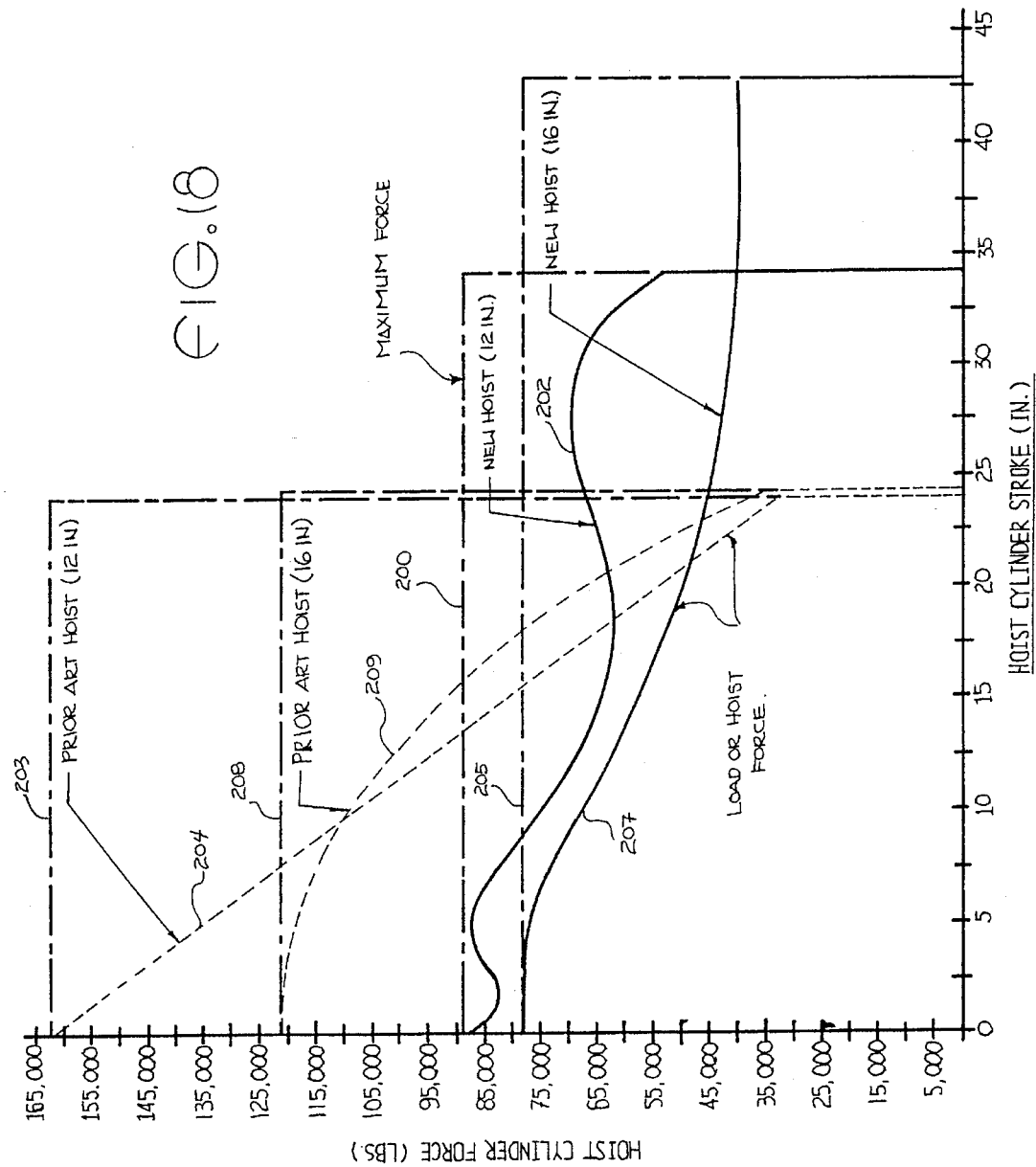
FIG. 18 is a graph illustrating the work available and the work required, for the embodiment of the present invention shown in FIGS. 1–9 and one of the more efficient prior art hoists.

Referring now to FIG. 18, a comparison between the work available and the work required for underbody hoists, specifically hoist mechanism 20 and a conventional prior art hoist can be made, referring to both twelve inch and sixteen inch mounting heights. Maximum work that can be done by a hydraulic cylinder during one extension stroke is equal to the maximum force of the cylinder times the maximum stroke length. Maximum work is therefore equal to the area under a maximum force curve which is plotted on a graph of cylinder force vs. cylinder stroke length (FIG. 18). In normal operation, the pressure required to extend the cylinder and therefore the actual force generated normally varies. Consequently the work actually done by a cylinder is equal to the area under an actual force curve plotted on the graph of FIG. 18. Hoist mechanism 20 is preferably constructed with a mounting height of twelve inches. The maximum force curve for this configuration is designated 200 and the actual force curve is designated 202. A maximum force curve 203 and an actual force curve 204 was generated in a conventional hoist having a twelve inch mounting height for purposes of comparison. One skilled in the art will understand that as a practical matter, prior art hoist cannot be mounted within twelve inches, because break-away or lift off forces would be prohibitively high.

A maximum force curve and actual force curve 205 and 207, respectively for hoist mechanism 20 having a sixteen inch mounting height and a maximum force curve and actual force curve 208 and 209, respectively for a conventional hoist are also plotted on the graph of FIG. 18.

As can be seen, break-away force, which is the force needed to start the cylinder stroke, varies greatly between actual force curves 202 and 204 and between actual force curves 207 and 209. The break-away force for the prior art hoist are much larger than for hoist mechanism 20. Since force generated by the cylinder is the product of the cross-sectional area times the pressure, then assuming constant pressure, a typical prior art hoist requires a much larger cylinder, or several cylinders acting together to provide the break-away force compound to the instant invention.

As plotted and by way of example, each hoist was lifting a load of 52,800 lbs. A ratio can be found of the weight of the load to the cylinder force required at break-away to differentiate the lifts. The ratio of weight lifted to cylinder force in the conventional hoist having a twelve inch mounting height would be 52,800/162,000= 32.6%. For a conventional hoist having a sixteen inch mounting the ratio is 52,800/121,000= 43.6%. The conventional hoist used was an underbody hoist of the scissor type and is shown as a hoist having a relatively high ratio.

The hoist of the present invention has a much higher ratio, the hoist with a twelve inch mounting height having a ratio of 52,800/89,000= 59.3% as compared to 32.6%. The hoist of the present invention with a sixteen inch mounting height having a ratio of 52,800/78,000= 67.7% as compared to 43.6%. Because of the design of the link structure previously described in FIGS. 1–9, the load weight to cylinder force ratio is substantially higher than the prior art. Therefore, due to its unique configuration, the hoist of the present invention can lift an identical load, with less cylinder force, allowing much smaller cylinders to be used. This is a great savings in weight and cost. Furthermore, the reduced break-away force required, allows for a mounting height of twelve inches, this is unworkable for prior art lifts. The mounting height is important for reasons stated previously, such as ease in loading and shipping.

Figures 12, 13:
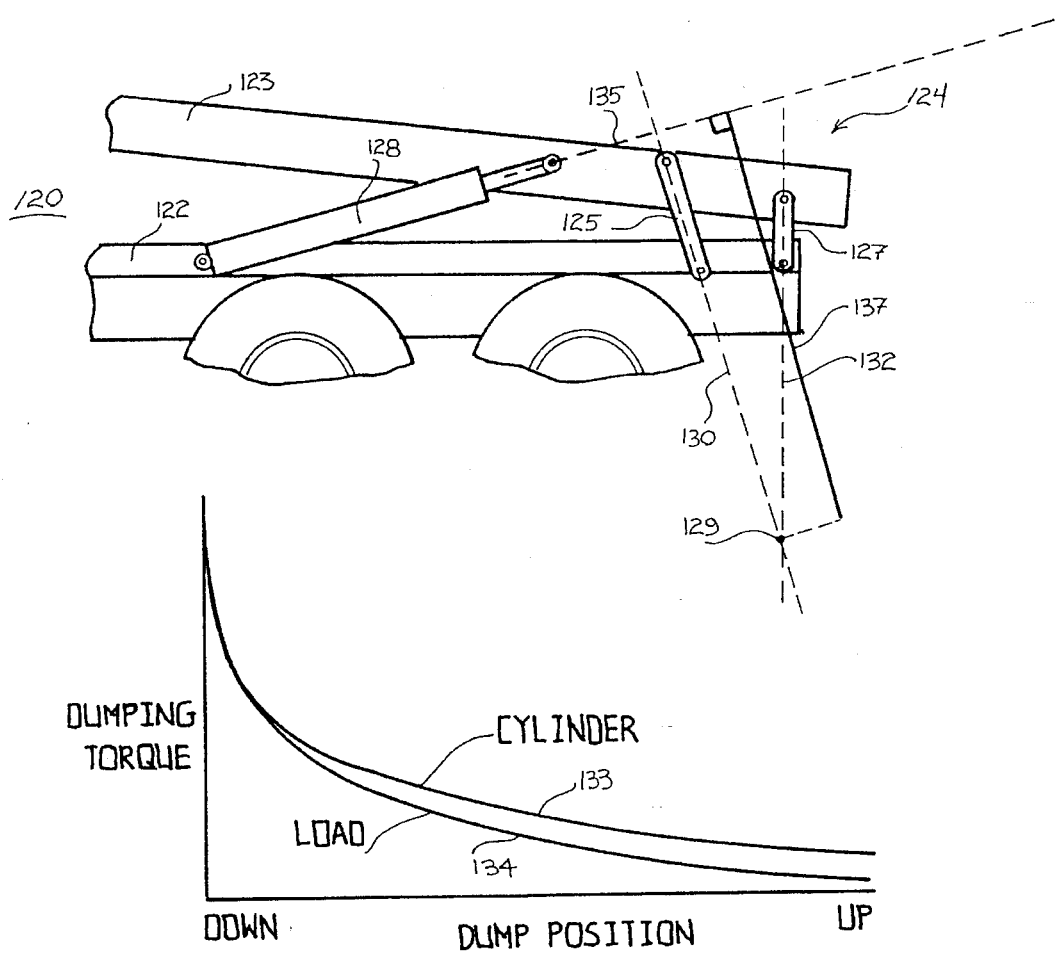
FIG. 12 is a diagrammatic side view of an alternate embodiment of the present invention.
FIG. 13 is a graph of the torque curve of the alternate dump hoist mechanism of FIG. 12.

Dump hoist mechanism 20 utilizes a plurality of links to form a pair of 6-bar linkages. The primary purpose of the pair of 6-bar linkages is to position instant center 107 along the desired path, and to distribute stress forces generated during lifting of the dump body. An alternate embodiment of a dump hoist mechanism generally designated 120 is illustrated in FIG. 12. Dump hoist mechanism 120 is generally similar in operation to embodiment 20, and includes a body subframe 123 pivotally coupled to a hoist subframe 122 by a dump linkage 124. Dump linkage 124 differs from dump linkage 24 of dump hoist mechanism 20 in that dump linkage 124 cooperates with body subframe 123 and hoist subframe 122 to form a pair of 4-bar linkages on opposing side of hoist mechanism 20 which act in parallel to one another. As with embodiment 20, each 4-bar linkage is identical, therefore only one will be described. Dump linkage 124 consisting of a front link 125 for each 4-bar linkage, pivotally coupled between body subframe 123 and hoist subframe 122 intermediate the forward end and the rearward end of dump hoist mechanism 120, and a back link 127 pivotally coupled between body subframe 123 and hoist subframe 122 proximate the rearward end. Body subframe 123 and hoist subframe 122 act as links, completing the 4-bar linkage. A hydraulic cylinder 128 is coupled between body subframe 123 and hoist subframe 122 moving body subframe 123 between a lowered position and a raised position. In this embodiment, dump linkage 124 functions primarily to drive an instant center 129 along a predetermined path, and does not distribute stress forces. In fact the stress forces generated on front link 125 and back link 127 are quite high. Therefore this embodiment is most useful on smaller dump vehicles which can be constructed strongly to withstand the stresses generated.

Since back link 127 operates substantially similar to back link 50, instant center 129 does not remain in a fixed position, but moves continuously through a predetermined path as body subframe 123 is moved. The location of instant center 129 at any given body angle, in this embodiment, is determined by extending a line 130 through the pivot points of front link 125 and extending a line 132 through the pivot points of back link 127. The intersection of lines 130 and 132 marks the position of instant center 129. As can be seen, instant center 129 is well below the level of the dump vehicle providing for a long lever arm. The length of the lever arm is determined by extending a line 135 in the direction of applied cylinder force. The length of a line 137 extending perpendicularly from line 135 to instant center 129 gives the length of the lever arm for this embodiment.

FIG. 13 illustrates a curve 133 of the available torque compared with a curve 134 of the required torque. As can be seen, these curves match very closely illustrating the efficiency of dump hoist.

Figure 19:
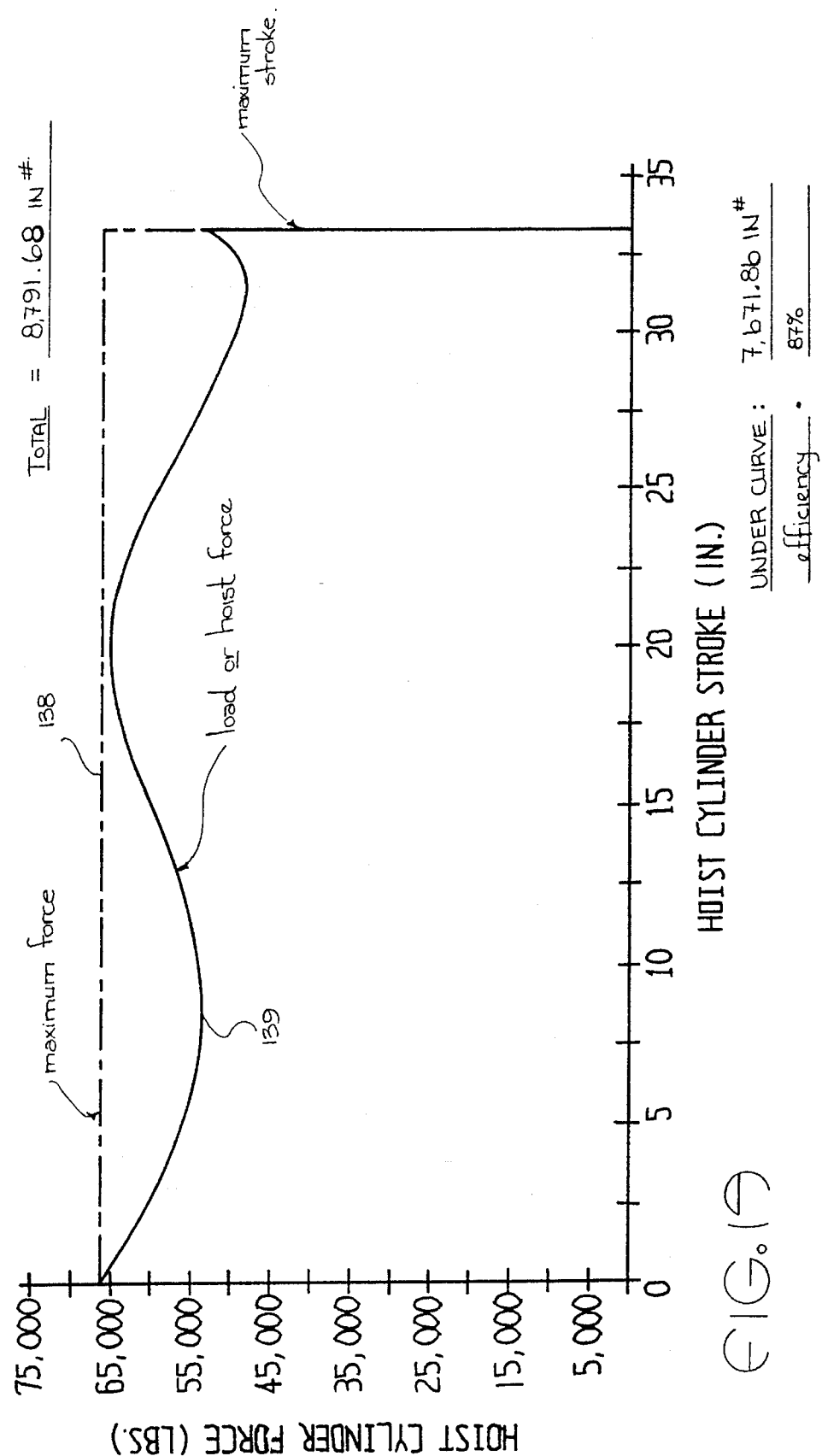
FIG. 19 is a graph illustrating the work available and the work required, for the embodiment of FIG. 12.

Referring now to FIG. 19, the efficiency of dump hoist mechanism 120 can be compared to prior art hoists by examining the work done by the cylinder. The maximum work that can be done by a hydraulic cylinder, during one extension stroke and using the engineering definition for work is equal to the maximum force of the cylinder times the maximum stroke. This amount of work is equal to the area under a maximum force curve 138 illustrated on FIG. 19. Maximum force curve 138 is plotted on a graph of force versus cylinder stroke. In normal operation, the pressure required to extend the cylinder and therefore the actual force generated normally varies. Consequently the work actually done by a cylinder is equal to the area under an actual force curve 139 as illustrated in FIG. 19. Actual force curve 139 is plotted on a graph of force versus stroke of the cylinder. The area under actual force curve 139 is equal to the work actually done in the case of the actual force curve or maximum work available in the case of maximum force curve 138. Efficiency of dump hoist mechanism 120 can be defined as the ratio of the actual work done divided by the maximum work available. Less efficient hoists require larger forces or longer strokes and therefor greater volumes of oil at rated pressure to do the same amount of work as the present invention. Thus they require larger, heavier more expensive cylinders and bigger more expensive pumps to operate the bigger cylinders.

For the particular hoist described by FIG. 19, the efficiency is 87%. Thus the hoist is considerably more efficient than the most efficient prior art hoists whose efficiency may be up to 80% at the highest. This may be seen by examination of FIG. 18 where a typical prior art hoist with a mounting height of 16 inches is shown and which has an efficiency less than 80%. As may be seen, a prior art hoist with a mounting height of 12 inches is considerably less efficient.

Figure 14:
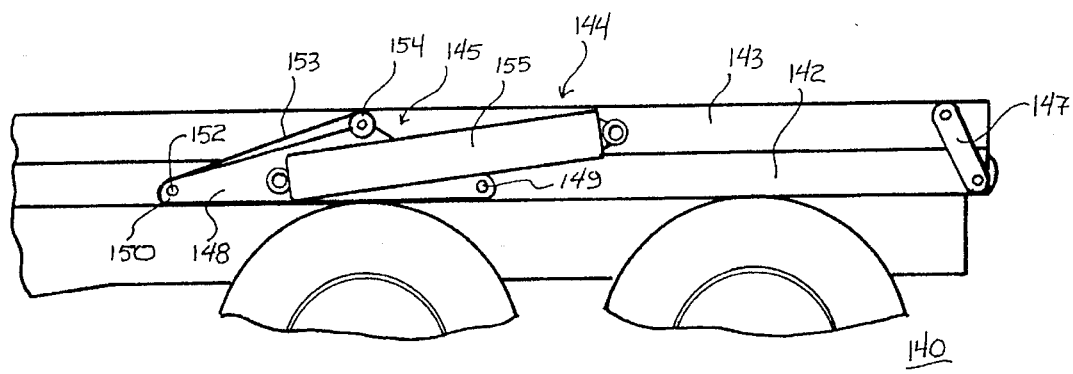
FIG. 14 is a diagrammatic side view of another embodiment of the present invention as it would appear in the lowered position.
Figure 15:
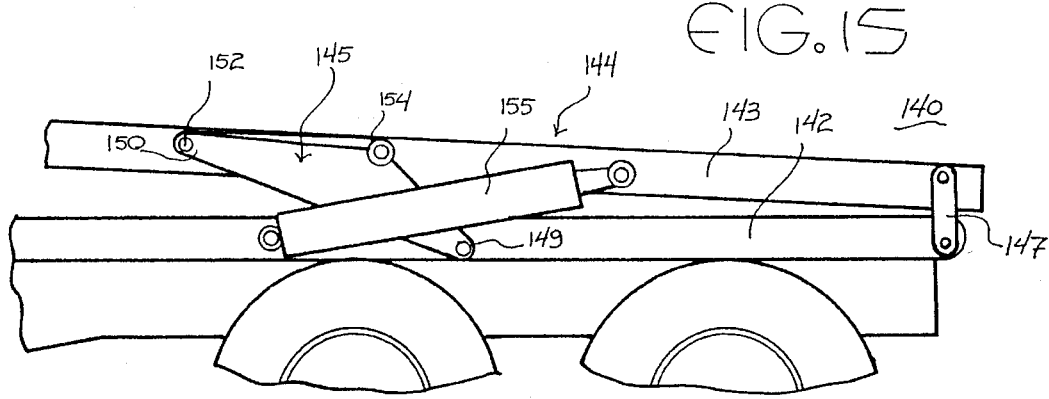
FIG. 15 is a diagrammatic side view of the hoist mechanism of FIG. 14 as it would appear in a partially raised position, just after lift off.
Figure 16:
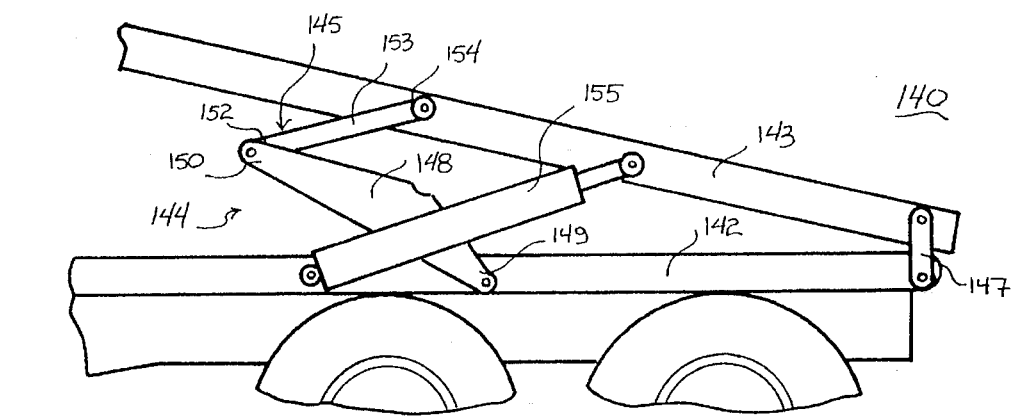
FIG. 16 is a diagrammatic side view of the hoist mechanism of FIGS. 14 and 15 as it would appear switching to a second phase of the lift.

Another embodiment of a dump hoist mechanism generally designated 140 is illustrated in FIGS. 14–16. Dump hoist mechanism 140 is generally similar in operation to embodiments 20 and 120, and includes a body subframe 143 pivotally coupled to a hoist subframe 142 by a dump linkage 144. Dump linkage 144 differs from dump linkages 24 and 124 of dump hoist mechanisms 20 and 120 in that dump linkage 144, with body subframe 143 and hoist subframe 142 cooperatively form a pair of 5-bar linkages. Dump linkage 144 includes a front link assembly 145 for each 5-bar linkage, pivotally coupled between body subframe 143 and hoist subframe 142 intermediate the forward end and the rearward end of dump hoist mechanism 140, and a back link 147 pivotally coupled between body subframe 143 and hoist subframe 142 proximate rearward end. Since front link assemblies 145 are substantially identical only one will be described in detail. Front link assembly 145 includes a toggle link 148 having an end 149 pivotally coupled to hoist subframe 142 and an opposing end 150 pivotally coupled to an end 152 of a front link 153. An opposing end 154 of front link 153 is pivotally coupled to body subframe 143. Body subframe 143 and hoist subframe 142 act as links, completing the 5-bar linkage. The linkage is actuated by a cylinder 155 coupled between hoist subframe 142 and body subframe 143.

Referring specifically to FIG. 14, in the lowered position, front link assembly 145 folds forward, with end 154 of front link 153 engaging toggle link 148 intermediate ends 149 and 150. Through lift off as shown in FIG. 15, front link assembly 145 acts as a single link, forming a 4-bar linkage with back link 147. As the lift progresses past lift off, link 142 hits a stop preventing further rotation. End 154 of front link 153 disengages toggle link 148. At this point the instant center of rotation stops moving, and is located at the upper pivot of back links 147. To provide stability in an inherently unstable 5-bar linkage system, stops (not shown) are added to limit the motion of the links as will be understood by those skilled in the art. This embodiment illustrates that various dump linkages may be employed with a moving instant center to provide various motions of the instant center and different stresses on the link members.

Figure 17:
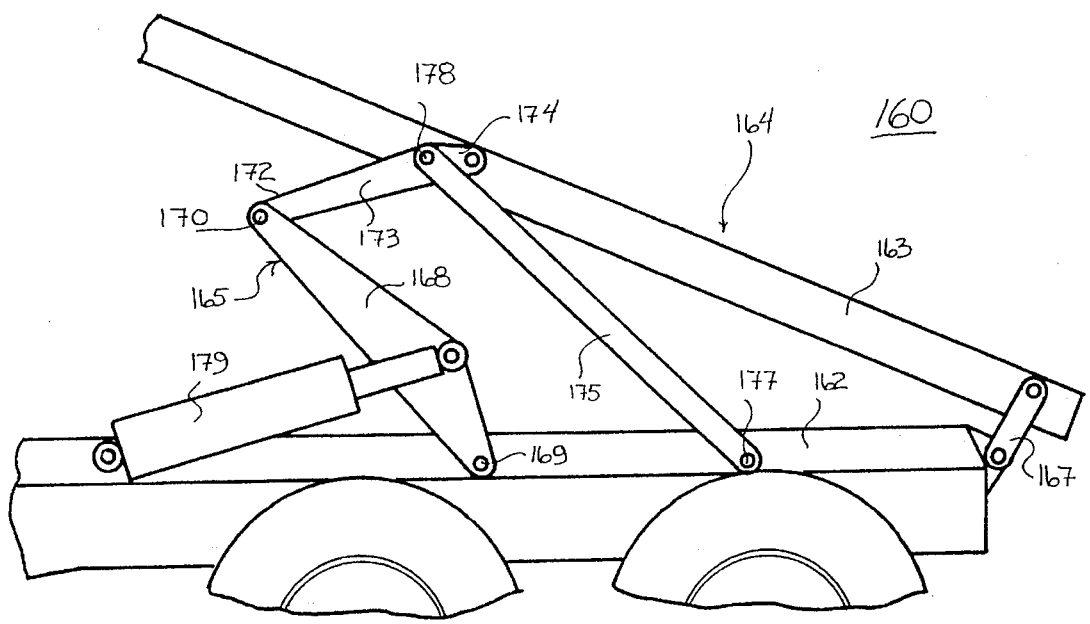
FIG. 17 is a diagrammatic side view of yet another embodiment of the present invention as it would appear partially raised.

Yet another embodiment of a dump hoist mechanism generally designated 160 is illustrated in FIG. 17. Dump hoist mechanism 160 is generally similar in operation to the previously described embodiments, and includes a body subframe 163 pivotally coupled to a hoist subframe 162 by a dump linkage 164. Dump linkage 164 with body subframe 163 and hoist subframe 162 cooperatively form a pair of 6-bar linkages as does dump linkage 24 of embodiment 20. Dump linkage 164 and includes a front link assembly 165 for each 6-bar linkage, pivotally coupled between body subframe 163 and hoist subframe 162 intermediate the forward end and the rearward end of dump hoist mechanism 160, and a back link 167 pivotally coupled between body subframe 163 and hoist subframe 162 proximate the rearward end. Front link assembly 165 includes a toggle link 168 having an end 169 pivotally coupled to hoist subframe 162 and an opposing end 170 pivotally coupled to an end 172 of a front link 173. An opposing end 174 of front link 173 is pivotally coupled to body subframe 163. A motion link 175 has an end 177 coupled to hoist subframe 162 intermediate back link 167 and toggle link 168, and an opposing end 178 coupled to front link 173 proximate end 174. Body subframe 163 and hoist subframe 162 act as links, completing the 6-bar linkage. Dump hoist mechanism 160 is intended to illustrate that a hydraulic cylinder 179 may be used to actuate any of the links of the front link assembly 165. In this embodiment, cylinder 179 operates the 6-bar linkage by being directly coupled to and moving toggle link 168 as contrasted with embodiment 20 in which cylinder 25 is directly coupled to body subframe 23 to actuate dump linkage 24. Dump hoist mechanism 160 is also intended to illustrate that motion link 175 may be coupled between any two non-adjacent links to control the motion of and to provide stability to the mechanism.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A hoist mechanism comprising:

a hoist subframe;

a body subframe;

a linkage coupling said body subframe to said hoist subframe such that said body subframe pivots about a continuously moving instant center of rotation, said instant center of rotation is positioned at a point below said hoist subframe with said body subframe in the lowered position and progresses upward as said body subframe is lifted to said raised position; and actuating means for moving said body subframe with respect to said hoist subframe between a lowered position and a raised position.

2. A hoist mechanism as claimed in claim 1 wherein said linkage includes:

a front link assembly coupled between said hoist subframe and said body subframe intermediate forward ends and rearward ends thereof; and a back link having a first end pivotally coupled to said hoist subframe proximate said rearward end thereof, and a second end pivotally coupled to said body subframe proximate said rearward end thereof.

3. A hoist mechanism as claimed in claim 2 wherein said front link assembly, said back link, said hoist subframe and said body subframe are constructed and coupled to cooperatively form a 6-bar linkage actuated by said actuating means, said front link assembly including three links.

4. A hoist mechanism as claimed in claim 3 wherein said front link assembly includes:

a toggle link having a first end pivotally coupled to said hoist subframe intermediate said forward end and said rearward end;

a front link having a first end pivotally coupled to a second end of said toggle link and a second end pivotally coupled to said body subframe intermediate said forward end and said rearward end; and a motion link having a first end pivotally coupled to said toggle link and a second end pivotally coupled to said body subframe rearward of said second end of said front link.

5. A hoist mechanism as claimed in claim 3 wherein said actuating means is a reciprocating cylinder having a first end coupled to said hoist subframe and a second end coupled to said body subframe.

6. A hoist mechanism as claimed in claim 3 further including a second 6-bar linkage acting in parallel with first said 6-bar linkage on opposing sides of said hoist mechanism.

7. A hoist mechanism as claimed in claim 1 wherein said linkage includes:

a front link coupled between said hoist subframe and said body subframe intermediate forward ends and rearward ends thereof; and a back link having a first end pivotally coupled to said hoist subframe proximate said rearward end thereof, and a second end pivotally coupled to said body subframe proximate said rearward end thereof.

8. A hoist mechanism as claimed in claim 7 wherein said front link, said back link, said hoist subframe and said body subframe are constructed and coupled to cooperatively form a 4-bar linkage actuated by said actuating means.

9. A hoist mechanism comprising:

a hoist subframe having a forward end and a rearward end;

a body subframe having a forward end and a rearward end;

a front link assembly pivotally coupled between said hoist subframe and said body subframe intermediate said forward ends and said rearward ends thereof, said front link assembly including:

a toggle link having a first end pivotally coupled to said hoist subframe intermediate said forward end and said rearward end;

a front link having a first end pivotally coupled to a second end of said toggle link and a second end pivotally coupled to said body subframe intermediate said forward end and said rearward end; and a motion link having a first end pivotally coupled to said toggle link and a second end pivotally coupled to said body subframe rearward of said second end of said front link;

a back link having a first end pivotally coupled to said hoist subframe proximate said rearward end thereof, and a second end pivotally coupled to said body subframe proximate said rearward end thereof; and actuating means for pivoting said body subframe about said hoist subframe between a lowered position and a raised position.

10. A hoist mechanism as claimed in claim 9 wherein said actuating means is a reciprocating cylinder having a first end coupled to said hoist subframe and a second end coupled to said body subframe.

11. A hoist mechanism as claimed in claim 9 further including a second front link assembly acting in parallel with first said front link assembly, said first said front link assembly and said second front link assembly being on opposing sides of said hoist mechanism.

12. A hoist mechanism as claimed in claim 11 wherein said second front link assembly includes:

a second toggle link having a first end pivotally coupled to said hoist subframe intermediate said forward end and said rearward end;

a second front link having a first end pivotally coupled to a second end of said toggle link and a second end pivotally coupled to said body subframe intermediate said forward end and said rearward end; and a second motion link having a first end pivotally coupled to said toggle link and a second end pivotally coupled to said body subframe rearward of said second end of said front link.

13. A hoist mechanism as claimed in claim 12 further including a second back link having a first end pivotally coupled to said hoist subframe proximate said rearward end thereof, and a second end pivotally coupled to said body subframe proximate said rearward end thereof, said first said back link and said second back link being on opposing sides of said hoist mechanism.

14. A hoist mechanism as claimed in claim 12 wherein said back link extends substantially completely between opposing sides of said hoist mechanism, operating cooperatively with said first said front link assembly and said second front link assembly.

15. A dump vehicle comprising:

a vehicle chassis having a frame;

a dump body; and a hoist mechanism pivotally coupling said dump body to said frame, said hoist mechanism including:

a linkage pivotally coupling said dump body to said frame such that said dump body pivots about an instant center of rotation which moves continuously as said dump body pivots, said instant center of rotation is positioned at a point below said frame with said dump body in the lowered position and progresses upward as said dump body is lifted to said raised position; and actuating means for pivoting said dump body about said frame between a lowered position and a raised position.

16. A hoist mechanism as claimed in claim 15 wherein said linkage includes:

a front link assembly coupled between said frame and said dump body intermediate forward ends and rearward ends thereof; and a back link having a first end pivotally coupled to said frame proximate said rearward end thereof, and a second end pivotally coupled to said dump body proximate said rearward end thereof.

17. A hoist mechanism as claimed in claim 16 wherein said front link assembly, said back link, said frame and said dump body are constructed and coupled to cooperatively form a 6-bar linkage actuated by said actuating means, said front link assembly including three links.

18. A hoist mechanism as claimed in claim 16 wherein said front link assembly includes:

a toggle link having a first end pivotally coupled to said frame intermediate said forward end and rearward end;

a front link having a first end pivotally coupled to a second end of said toggle link and a second end pivotally coupled to said dump body intermediate said forward end and said rearward end; and a motion link having a first end pivotally coupled to said toggle link and second end pivotally coupled to said dump body rearward of said second end of said front link.

19. A hoist mechanism as claimed in claim 15 wherein said actuating means is a reciprocating cylinder having a first end coupled to said frame and a second end coupled to said dump body.

20. A hoist mechanism as claimed in claim 18 further including a second 6-bar linkage acting in parallel with first said 6-bar linkage on opposing sides of said hoist mechanism.

21. A hoist mechanism as claimed in claim 15 wherein said linkage includes:

a front link coupled between said frame and said dump body intermediate forward ends and rearward ends thereof; and a back link having a first end pivotally coupled to said frame proximate said rearward end thereof, and a second end pivotally coupled to said dump body proximate said rearward end thereof.

22. A hoist mechanism as claimed in claim 21 wherein said front link, said back link, said frame and said dump body are constructed and coupled to cooperatively form a 4-bar linkage actuated by said actuating means.

23. A dump vehicle comprising:

a vehicle chassis having a frame;

a dump body; and a hoist mechanism pivotally coupling said dump body to said frame, said hoist mechanism including:

a front link assembly coupled between said frame and said dump body intermediate forward ends and rearward ends thereof, said front link assembly including:

a toggle link having a first end pivotally coupled to said frame intermediate said forward end and rearward end;

a front link having a first end pivotally coupled to a second end of said toggle link and a second end pivotally coupled to said dump body intermediate said forward end and said rearward end; and a motion link having a first end pivotally coupled to said toggle link and second end pivotally coupled to said dump body rearward of said second end of said front link;

a back link having a first end pivotally coupled to said frame proximate said rearward end thereof, and a second end pivotally coupled to said dump body proximate said rearward end thereof; and actuating means for pivoting said dump body about said frame between a lowered position and a raised position.

24. A hoist mechanism as claimed in claim 23 wherein said actuating means is a reciprocating cylinder having a first end coupled to said frame and a second end coupled to said dump body.

25. A hoist mechanism as claimed in claim 24 further including a second front link assembly acting in parallel with first said front link assembly, said first said front link assembly and said second front link assembly being on opposing sides of said hoist mechanism.

26. A hoist mechanism as claimed in claim 25 further including a second back link having a first end pivotally coupled to said frame proximate said rearward end thereof, and a second end pivotally coupled to said dump body proximate said rearward end thereof, said first said back link and said second back link being on opposing sides of said hoist mechanism.

* * * * *